(12) United States Patent
Boyle et al.

(10) Patent No.: US 8,589,778 B2
(45) Date of Patent: Nov. 19, 2013

(54) SYSTEM AND METHOD FOR PROCESSING MULTI-MODAL COMMUNICATION WITHIN A WORKGROUP

(75) Inventors: Peter Currie Boyle, Burnaby (CA); Yu Zhang, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 1169 days.

(21) Appl. No.: 11/965,114

(22) Filed: Dec. 27, 2007

(65) Prior Publication Data

US 2008/0189633 A1 Aug. 7, 2008

(30) Foreign Application Priority Data

Dec. 27, 2006 (CA) .................................... 2572116

(51) Int. Cl.
*G06F 17/00* (2006.01)
(52) U.S. Cl.
USPC ........... 715/201; 715/204; 715/206; 715/208; 715/259
(58) Field of Classification Search
USPC ......... 715/201, 205, 229, 249, 204, 206, 208, 715/259
See application file for complete search history.

(56) References Cited

U.S. PATENT DOCUMENTS

| | | | | |
|---|---|---|---|---|
| 5,677,739 | A * | 10/1997 | Kirkland | 348/468 |
| 5,729,741 | A | 3/1998 | Liaguno et al. | |
| 6,119,147 | A | 9/2000 | Toomey et al. | |
| 6,185,592 | B1 * | 2/2001 | Boguraev et al. | 715/256 |
| 6,243,713 | B1 | 6/2001 | Nelson et al. | |
| 6,792,448 | B1 | 9/2004 | Smith | |
| 6,901,585 | B2 | 5/2005 | Dutta et al. | |
| 6,941,509 | B2 | 9/2005 | Harris | |
| 7,000,194 | B1 | 2/2006 | Newbold | |
| 7,515,770 | B2 * | 4/2009 | Fukada | 382/284 |
| 7,676,092 | B2 * | 3/2010 | Lagardere et al. | 382/187 |
| 7,680,654 | B2 | 3/2010 | Goronzy et al. | |
| 7,765,208 | B2 * | 7/2010 | Starbuck et al. | 707/736 |
| 7,996,227 | B2 | 8/2011 | Boyle et al. | |
| 8,055,592 | B2 | 11/2011 | Boyle et al. | |
| 8,081,824 | B2 * | 12/2011 | Li et al. | 382/190 |
| 2001/0018698 | A1 | 8/2001 | Uchino et al. | |
| 2002/0032815 | A1 | 3/2002 | Chiba et al. | |

(Continued)

FOREIGN PATENT DOCUMENTS

EP 1209849 3/2007

OTHER PUBLICATIONS

Groupware: Links, Usability First, http://www.usabilityfirst.com/groupware/cscw.txl; Aug. 14, 2007.

(Continued)

*Primary Examiner* — Stephen Hong
*Assistant Examiner* — Matthew Ludwig
(74) *Attorney, Agent, or Firm* — George R. McGuire; Bond Schoeneck & King PLLC

(57) ABSTRACT

There is disclosed a system and method for processing multi-modal collaboration. In an embodiment communication received from multiple modes are converted into a common format. Using various conversion modules, the communication may be converted into a common electronic text format (e.g. ASCII text) that contains keywords. Once the communication is converted into a common format, the information contained in the communication may be analyzed and consolidated into related areas or topics. The consolidated information may then be searched for common references in order to augment the information context.

14 Claims, 7 Drawing Sheets

(56) References Cited

U.S. PATENT DOCUMENTS

| | | | |
|---|---|---|---|
| 2002/0188681 | A1 | 12/2002 | Gruen et al. |
| 2003/0131055 | A1 | 7/2003 | Yashchin et al. |
| 2004/0054737 | A1* | 3/2004 | Daniell .................. 709/206 |
| 2004/0133560 | A1* | 7/2004 | Simske .................. 707/3 |
| 2004/0141630 | A1 | 7/2004 | Bhaskaran et al. |
| 2004/0181412 | A1 | 9/2004 | Menhardt |
| 2006/0015342 | A1 | 1/2006 | Kurzweil et al. |
| 2006/0218192 | A1* | 9/2006 | Gopalakrishnan ......... 707/104.1 |
| 2008/0077572 | A1 | 3/2008 | Boyle et al. |
| 2008/0082426 | A1* | 4/2008 | Gokturk et al. .................. 705/27 |
| 2008/0114601 | A1 | 5/2008 | Boyle et al. |
| 2008/0195595 | A1* | 8/2008 | Masuyama et al. ............... 707/5 |
| 2009/0013255 | A1* | 1/2009 | Yuschik et al. ............... 715/728 |
| 2009/0106019 | A1* | 4/2009 | Chen et al. ......... 704/9 |
| 2009/0234688 | A1* | 9/2009 | Masuyama et al. ............... 705/7 |
| 2009/0313026 | A1* | 12/2009 | Coffman et al. ............. 704/275 |
| 2012/0093371 | A1* | 4/2012 | Li et al. ......... 382/106 |
| 2012/0303370 | A1* | 11/2012 | Bangalore et al. ............ 704/249 |

OTHER PUBLICATIONS

Robert Slagter, Dynamic Groupware Services, Modular Design of Tailorable Groupware, Telematica Institute Enschede, The Netherlands, 2004.

Microsoft, FYI, The Insiders Guide to Microsoft Technology, Jul. 2005.

IBM, Collaboration in context with IBM Workplace Collaboration Service 2.5, http://www-128.ibm.com/developerworks/lotus/library/wcs-collaboration/index.html.

IBM, A system for context augmentation for casual electronic interchanges including instant messaging, email, etc., An IP.com Prior Art Database Technical Disclosure, Nov. 4, 2005, IP.com No. IPCOM000131030D, p. 1.

Cubranic, D. et al., Hipikat: Recommending Pertinent Software Devleopment Artifacts, Department of Computer Science, University of British Columbia, Canada, 2003, pp. 408-418.

Li, et al., Real-Time Topics Extraction and Visualization in Online Discussions, Proceedings of 2002 International Conference on Machine Learning and Cybernetics (Cat. No. 02E.X583), 2002, pt. 2, pp. 928-33, vol. 2, ISBN: 0 7803-7508-4.

Loh, et al., Analyzing Web Chat Messages for Recommending Items From a Digital Library, ICEIS 2004—Proceedings of the Sixth International Conference on Enterprise Information Systems, ICEIS 2004—Proceedings of the Sixth International Conference on Enterprise Information Systems, 2004, pp. 41-48, ISBN 9728805007.

Creating and Managing Knowledge in Real-time, http://64.233.179.104/search?q=cache:DhSL5H_7NOUJ:www.suprasphere.com/SupraSphere_KRS.pdf+a+process+ for+automatically+ context+ threading+instant•messaging+sessions&hl=en&gl=in& ct=clnk& cd=1; http://www.suprasphere.com/product/details.html#discussions), May 20, 2004, pp. 1-4.

Pimentel, M., et al., Co-text Loss in Textual Chat Tools, Lecture Notes in Artificial Intelligence (Subseries of Lecture Notes in Computer Science), LNAI 2680, Modeling and Using Context, 2003, pp. 483-490, ISSN: 0302-9743 Coden: LNAIE4.

Resnik, P., Semantic Similarity in a Taxonomy: An Information-Based Measure and its Application to Problems of Ambiguity in Natural Language, Journal of Artificial Intelligence Research 11, pp. 95-130. 1999.

Friburger, D. et al., Textual Similarity based on Proper Names, Li, Laboratoire d'Informatique de Tours, Tours, France, pp. 1-10, 2002.

Lin, D. et al., Induction of Semantic Classes from Natural Language Text, KDD 01, pp. 317-322, 2001.

Freudenberg, J. et al., A similarity-based method for genome-wide prediction of disease-relevant human genes, Bioinformatics, vol. 18, Suppl. 2 2002, pp. S110-S115, 2002.

Wen, J et al., Query Clustering Using User Logs, ACM Transactions on Information Systems, vol. 20, No. 1, pp. 59-81, Jan. 2002.

Brooks, C. et al., Improved Annotation of the Blogosphere via Autotagging and Hierarchical Clustering, WWW 2006, pp. 625-631, May 2006.

Benkhalifa, M. et al., Integrating WordNet Knowledge to Supplement Training Data in Semi-Supervised Agglomerative Hierarchical Clustering for Text Categorization, Journal of Intelligent Systems, vol. 16. pp. 929-947, 2001.

Torra, V Et al., Exploration of Textual Document Archives Using A Fuzzy Hierarchical Clustering Algorithm in the GAMBAL System, Information and Processing Management, 41, pp. 587-598, Mar. 2004.

Jannink, J., Thesaurus Entry Extraction from an On-line Dictionary, Stanford University, pp. 1-9, 1999.

Jin, S. et al., Study of Automatic Abstracting Based on Corpus and Hierarchical Dictionary, Journal of Software, pp. 308-314, 2000.

Roth, P. et al., An Audio-Haptic Tool for Non-Visual Image Representation, Proceedings of the Sixth International Symposium on Signal Processing and its Applications (Cat. No. 01EX467), 2001, vol. 1, pp. 64-67.

Office Action (Mail Date Jul. 19, 2010) for U.S. Appl. No. 11/828,416, filed Jul. 26, 2007; pp. 1-11.

Amendment filed Oct. 15, 2010 in response to Office Action (Mail Date Jul. 19, 2010) for U.S. Appl. No. 11/828,416, filed Jul. 26, 2007; pp. 1-8.

Office Action (Mail Date Jan. 3, 2011) for U.S. Appl. No. 11/828,416, filed Jul. 26, 2007; pp. 1-12.

Amendment filed Apr. 4, 2011 in response to Office Action (Mail Date Jan. 3, 2011) for U.S. Appl. No. 11/828,416, filed Jul. 26, 2007; pp. 1-10.

Notice of Allowance and Fee(s) Due (Mail Date Jun. 23, 2011) for U.S. Appl. No. 11/828,416, filed Jul. 26, 2007; pp. 1-5.

Corrected Notice of Allowability (Mail Date Sep. 1, 2011) for U.S. Appl. No. 11/828,416, filed Jul. 26, 2007; pp. 1-3.

Office Action (Mail Date Aug. 30, 2010) for U.S. Appl. No. 11/866,495, filed Oct. 3, 2007; pp. 1-20.

Amendment filed Nov. 24, 2010 in response to Office Action (Mail Date Aug. 30, 2010) for U.S. Appl. No. 11/866,495, filed Oct. 3, 2007; pp. 1-15.

Office Action (Mail Date Feb. 2, 2011) for U.S. Appl. No. 11/866,495, filed Oct. 3, 2007; pp. 1-19.

Amendment filed Mar. 9, 2011 in response to Office Action (Mail Date Feb. 2, 2011) for U.S. Appl. No. 11/866,495, filed Oct. 3, 2007; pp. 1-14.

Notice of Allowance and Fee(s) Due (Mail Date Mar. 24, 2011) for U.S. Appl. No. 11/866,495, filed Oct. 3, 2007; pp. 1-7.

\* cited by examiner

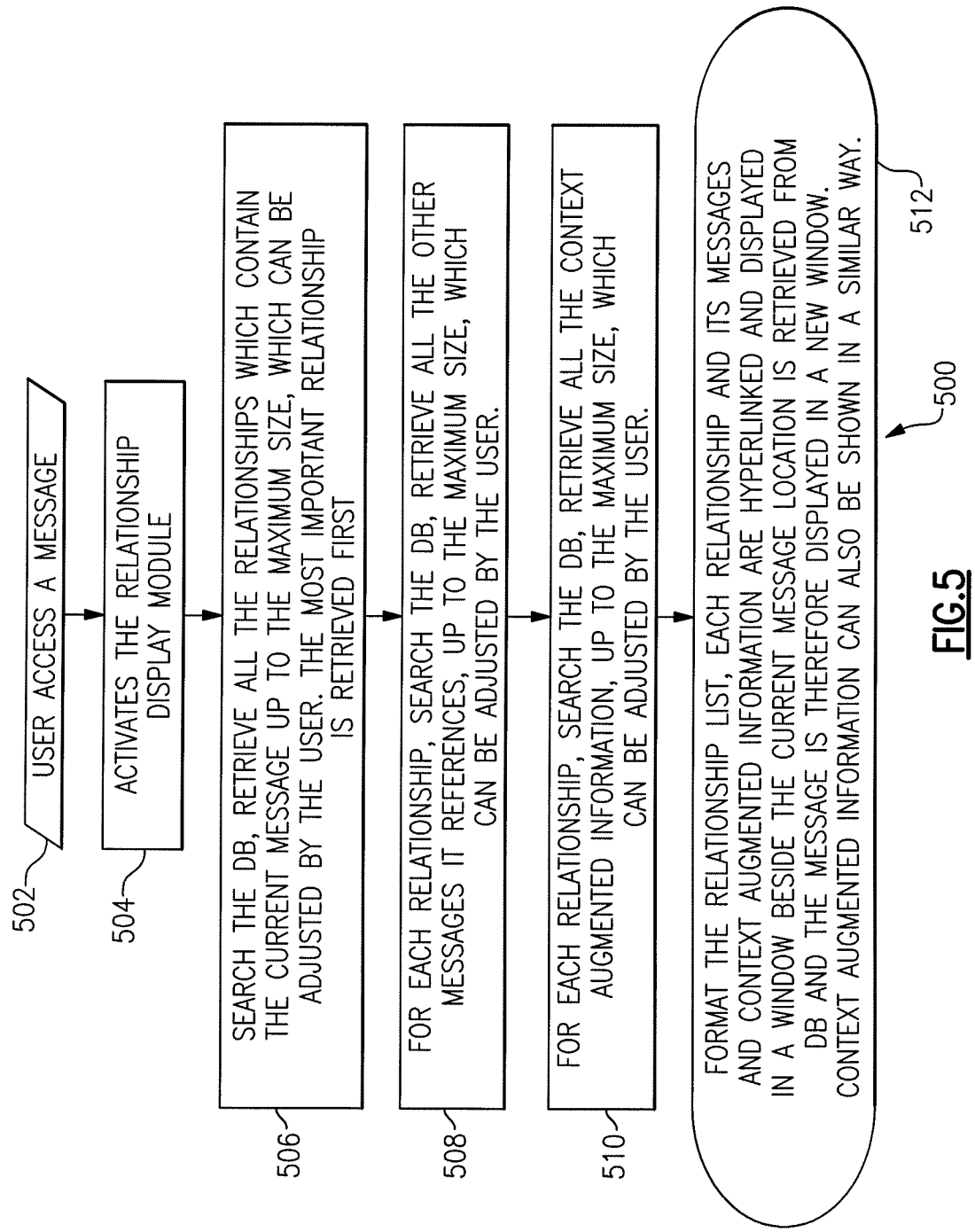

SYSTEM AND METHOD FOR PROCESSING MULTI-MODAL COMMUNICATION WITHIN A WORKGROUP

PRIORITY CLAIM

The present application claims priority to Canadian Patent Application Patent Serial Number CA2572116, filed on Dec. 27, 2006; all of the foregoing patent-related document(s) are hereby incorporated by reference herein in their respective entirety(ies).

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

The present invention relates to systems and methods for processing multi-modal communications, particularly within a workgroup.

Individuals within workgroups often communicate with each other in various modes of communication including voice mail, electronic mail (email), instant text messaging, text documents, etc. Presently, multi-modal communication systems for workgroups may comprise separate and independent solutions for each of these communication modes, and this may limit the ways in which communications from various individuals and sources may be used together.

Consider, for example, a health care workgroup in which a physician is assessing a patient, and has received some or all of the following pieces of communication: a voice tape recording of the patient's physical examination; laboratory results received by email; reference documents that contain text (e.g., the patient's medical history or an online text books); a voice mail from a radiologist about what information the patient's X-ray contains; and various reference documents (e.g., web medication sites) that contain charts. All of these various pieces of communication using different communication modes may be potentially important sources of information that may aid the physician in making the correct diagnosis for the patient's condition, and the information needed may in fact be scattered between two or more pieces of information in different communication modes.

What is needed is a more effective way for processing multi-modal communications, particularly within a workgroup.

SUMMARY

The present invention relates to a system and method for processing multi-modal communications, particularly within a workgroup.

In an embodiment, communications or messages received from multiple communication modes are converted into a common text format. In the health care workgroup example described above, using various conversion modules, the messages may be converted into a common electronic text format (e.g., ASCII text) that contains keywords.

In another embodiment, once the messages are converted into a common format, the information contained in the messages may be analyzed and consolidated into related areas or topics. The messages may then be searched for common references in order to augment their context (referred to herein as "context augmentation" and as described further below).

In an illustrative embodiment, the system may include various components, such as: a real time message monitor component which is configured to intercept each incoming message; a voice recognition component configured to translate a voice message into text; an image understanding component configured to interpret an image and describe the image in text; a natural language parsing engine configured to obtain a list of keywords (e.g., noun phrases); a digital hierarchical dictionary used to evaluate a similarity distance between the keywords for each message; a member similarity based clustering algorithm configured to classify the messages into different possibly overlapping context threads; a context augmenting component configured to retrieve additional information to augment a context thread; and a GUI component which may be used to show a list of context threads that a current message belongs to. These components are described in more detail further below.

Thus, in an aspect of the invention, there is provided a method of processing multi-modal communications, comprising: intercepting each incoming message; converting, as necessary, each message into a common text format; and parsing each message in the common text format into a list of keywords.

In an embodiment, the method further comprises analyzing the list of keywords for each message, and calculating a similarity distance between the messages.

In another embodiment, the method further comprises clustering the messages by organizing them into related topics in dependence upon the calculated similarity distances.

In another embodiment, the method further comprises searching for common references in the messages, and augmenting the context of the common references by linking related content.

In another embodiment, the method further comprises hyperlinking the related content.

In another embodiment, the method further comprises displaying the clustered messages as a list of context threads.

In another aspect of the invention, there is provided a system for processing multi-modal communications, comprising: a real time message monitor component for intercepting each incoming message; a conversion module for converting, as necessary, each message into a common text format; and a natural language parsing engine configured to parse each message in the common text format into a list of keywords.

In another embodiment, the system further comprises a digital hierarchical dictionary for calculating a similarity distance between the list of keywords for each message.

In another embodiment, the system further comprises a member similarity based clustering algorithm module for clustering the messages into context threads.

In another embodiment, the system further comprises a context augmenting module configured to search the messages for common references, and to augment the context of the common references by linking related content.

In another embodiment, the context augmenting module is further configured to hyperlink the related content.

In another embodiment, the system further comprises a GUI component configured to show the clustered messages as a list of context threads.

In another aspect of the invention, there is provided a data processor readable medium storing data processor code that, when loaded into a data processing device, adapts the device to perform a method of processing multi-modal communications, the data processor readable medium comprising: code for intercepting each incoming message; code for converting, as necessary, each message into a common text format; and code for parsing each message in the common text format into a list of keywords.

In another embodiment, the data processor readable medium further comprises code for analyzing the list of keywords for each message, and calculating a similarity distance between the messages.

In another embodiment, the data processor readable medium further comprises code for clustering the messages by organizing them into related topics in dependence upon the calculated similarity distances.

In another embodiment, the data processor readable medium further comprises code for searching for common references in the messages, and augmenting the context of the common references by linking related content.

In another embodiment, the data processor readable medium further comprises code for hyperlinking the related content.

In another embodiment, the data processor readable medium further comprises code for displaying the clustered messages as a list of context threads.

These and other aspects of the invention will become apparent from the following more particular descriptions of exemplary embodiments.

BRIEF DESCRIPTION OF THE DRAWINGS

In the figures which illustrate exemplary embodiments of the invention:

FIG. 3 to FIG. 5 show flowcharts of a method in accordance with an embodiment.

DETAILED DESCRIPTION

As noted above, the present invention relates to a system and method for multi-modal communication in a workgroup.

Figure 1:
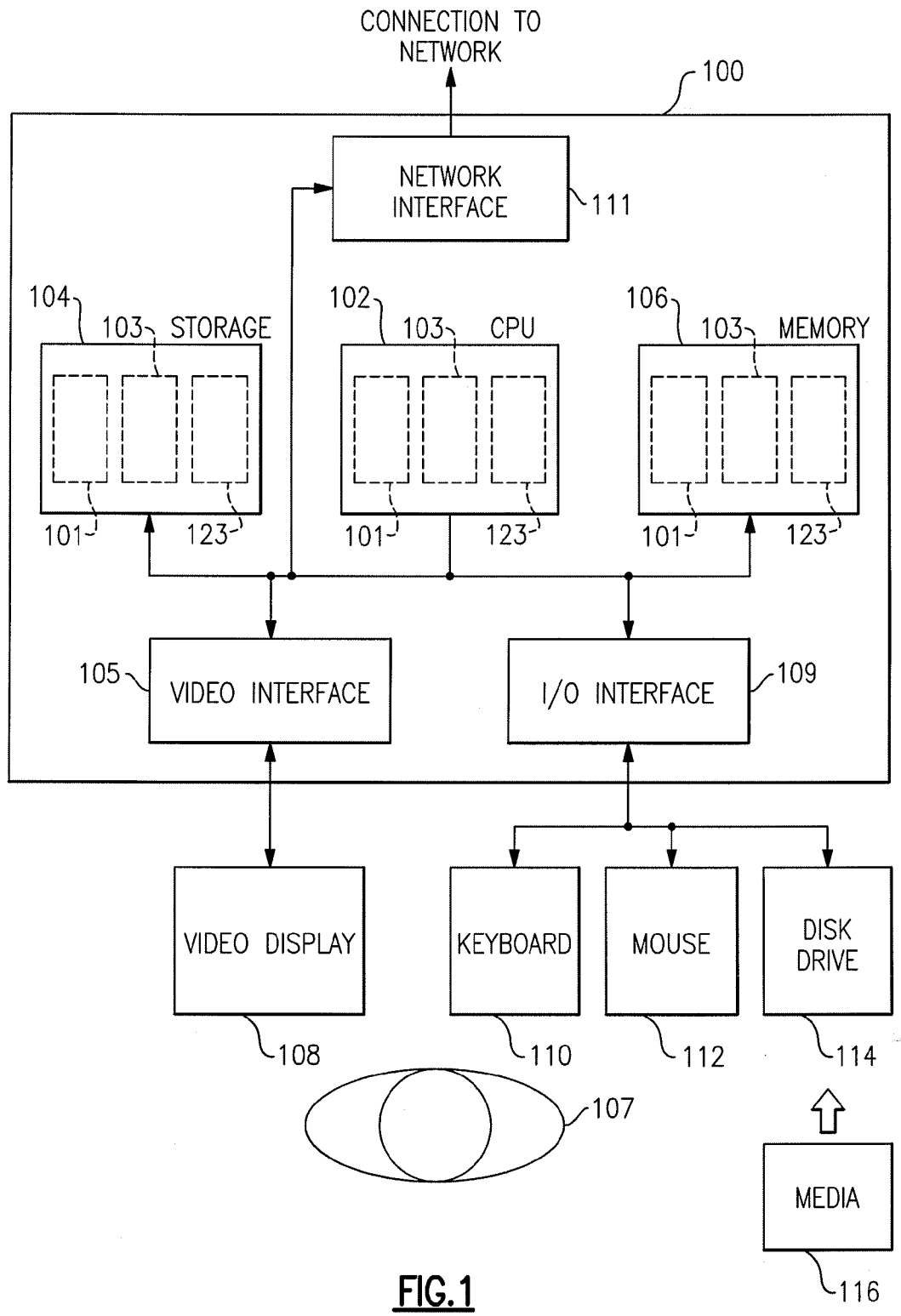
FIG. 1 shows a generic data processing system that may provide a suitable operating environment.

The invention may be practiced in various embodiments. A suitably configured data processing system, and associated communications networks, devices, software and firmware may provide a platform for enabling one or more of these systems and methods. By way of example, FIG. 1 shows a generic data processing system 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. An operator 107 may interact with the data processing system 100 using a video display 108 connected by a video interface 105, and various input/output devices such as a keyboard 110, mouse 112, and disk drive 114 connected by an I/O interface 109. In known manner, the mouse 112 may be configured to control movement of a cursor in the video display 108, and to operate various graphical user interface ("GUI") controls appearing in the video display 108 with a mouse button. The disk drive 114 may be configured to accept data processing system readable media 116. The data processing system 100 may form part of a network via a network interface 111, allowing the data processing system 100 to communicate with other suitably configured data processing systems (not shown). The particular configurations shown by way of example in this specification are not meant to be limiting.

Figure 2A:
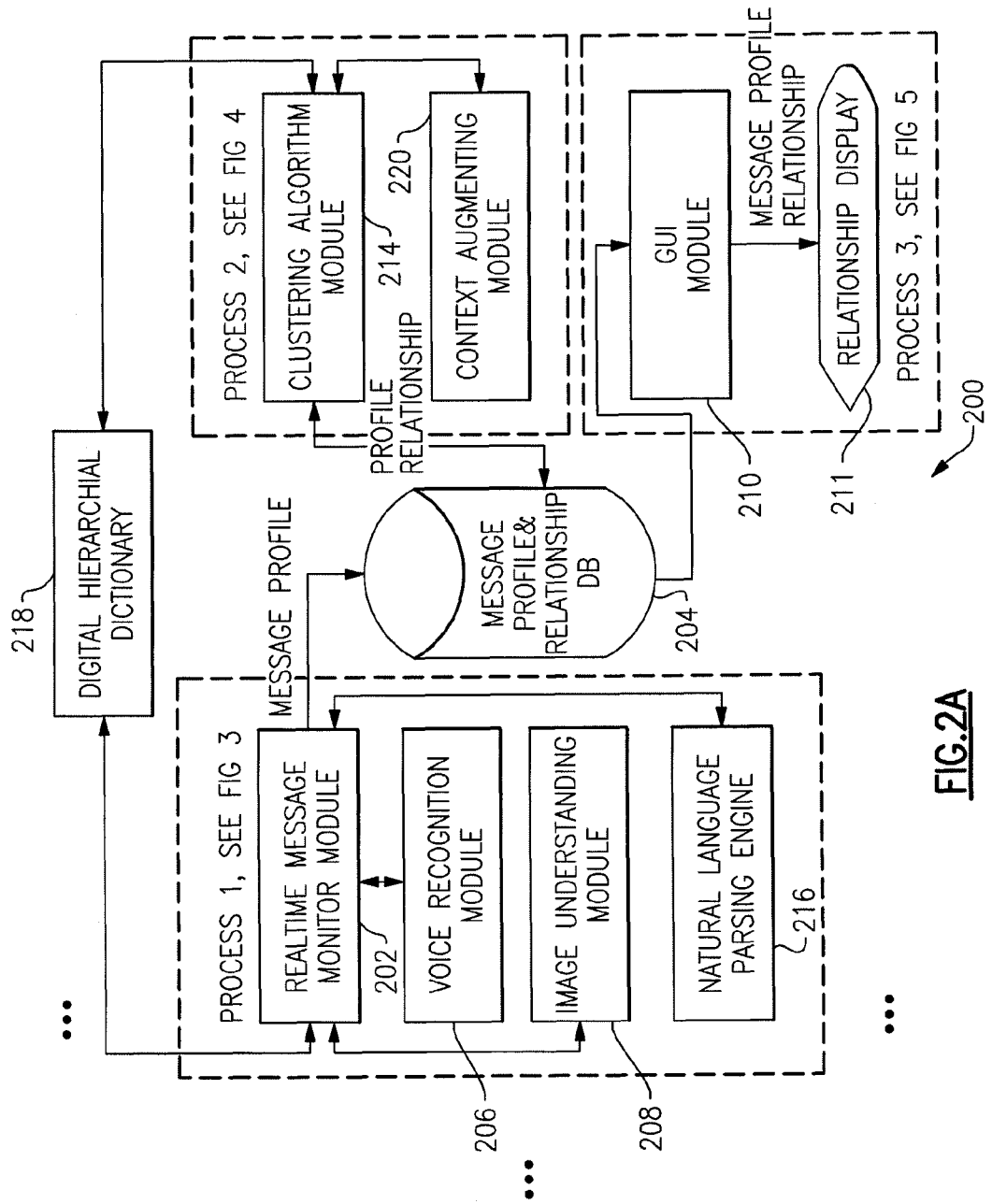
FIG. 2A shows a schematic block diagram of illustrative components in a system in accordance with an embodiment.

Now referring to FIG. 2A, a system 200 in accordance with an embodiment may include various modules. As shown, system 200 may include a real time message monitor module 202 which may be configured to intercept each incoming message or piece of communication. Real time message monitor 202 may be configured to output a message profile for storage in a message profile and relationship database 204.

System 200 may also include a voice recognition module 206 which may be configured to translate voice content to text messages. System 200 may further include an image understanding module 208 which is configured to interpret images into text messages. Interpretation of images may be accomplished by a process as described, for example, in co-pending U.S. patent application Ser. No. 11/866,495 , entitled System and Method for Inserting a Description of Images into Audio Recordings, which is hereby incorporated by reference in its entirety.

System 200 may also include a language parsing engine 216 which may be used to extract meaningful noun phrases (keywords) for constructing a message profile. The real time message monitor module 202 may also be operatively connected to digital hierarchical dictionary 218 for calculating the meaningfulness of the keywords, as described in co-pending U.S. patent application Ser. No. 11/828,416, entitled System and Method for Clustering Data Objects, which is hereby incorporated by reference in its entirety.

System 200 may further include a GUI module 210 for receiving a message profiles and relationships input from message profile and relationship database 204, GUI module 210 may be suitably configured to provide a relationship display 211, which may show the relationships between messages. This is described in more detail further below with reference to FIG. 5.

Still referring to FIG. 2A, system 200 may further include a clustering algorithm module 214 for clustering related messages. As will be explained in more detail further below, clustering algorithm module 214 may be used to cluster messages into different and possibly overlapping context threads. The clustering algorithm module 214 may be operatively connected to the message profile and relationship database 204 for retrieving new message profiles and storing updated and new relationships. The clustering algorithm module 214 may also be operatively connected to digital hierarchical dictionary 218 for calculating similarity distances between the keywords. In an embodiment, a digital hierarchical dictionary 218 may also be provided to evaluate a similarity distance between the noun phrases, as described in co-pending U.S. patent application Ser. No. 11/828,416, entitled System and Method for Clustering Data Objects, which is hereby incorporated by reference in its entirety.

System 200 may therefore be configured to integrate multi-modal communications and determine linkages. For example, in the health care example, if the patient's lab report came back with an anti-nuclear antibodies (ANA) result of 1:80, and information received in another communication mode states that in Lyme Disease ANA values are typically between 1:40 to 1:120, then these pieces of information may be presented together as potentially relevant information that may assist the physicians with their diagnosis.

System 200 may further be interconnected to a context augmenting module 220, which may be configured to augment the context. For example, the pieces of information consolidated together using multi-modal communication processing as described above may be augmented by linking keywords or portions of text to related information (e.g., via hyperlinking). This related information and their start up/lookup instructions may be stored in a database. For example, keywords like "Lyme Disease" may be hyperlinked to a map of the US, to the words "United States", and to the medical institution that was the source (e.g., the Center for Disease Control). As another example, lab results for a patient may be hyperlinked to a reference that describes how to interpret the results. The link could be online or offline, and could be, for example, web hot links, or simple text comments embedded in a text document.

Figure 2B:
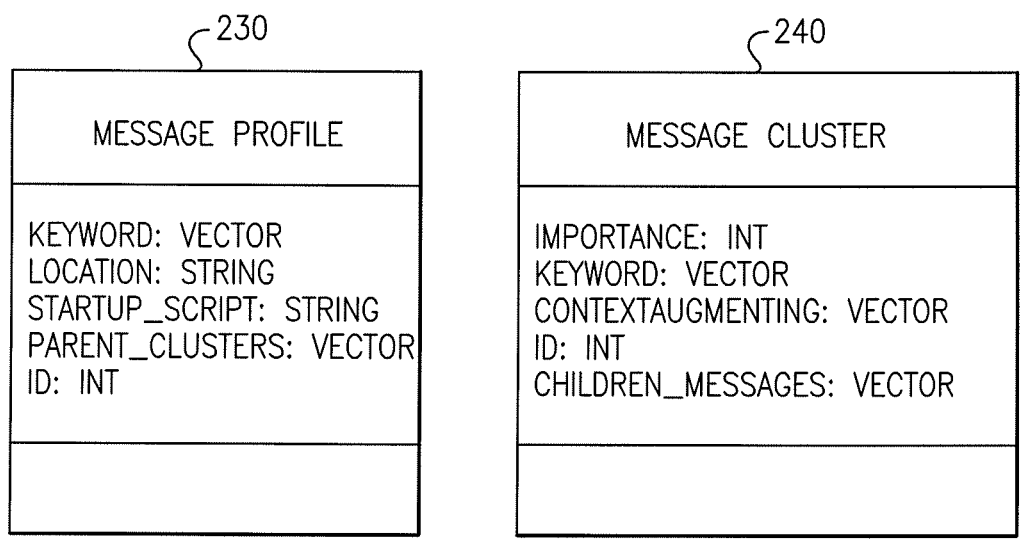
FIG. 2B shows illustrative class diagrams for a message profile and message cluster.

Now referring to FIG. 2B, shown are illustrative class diagrams for a message profile class 230 and message cluster class 240, respectively. Objects of these two classes are stored and retrieved to/from a database. Message profile class 230 has five attributes. ID attribute is the identifier used as the unique key. Keyword attribute is a container for storing a list of keywords. Location attribute is used for storing the message resource location, for example, "c:\notes\meeting.avi". Startup_script attribute is used for storing the scripts to start an appropriate application to load the message. Parent_clusters attribute is a container for storing its parent clusters IDs. Message cluster class 240 has five attributes. ID attribute is the identifier used as the unique key. Importance attribute represents the popularity and meaningfulness of the cluster. Keyword attribute is a container for storing a list of keywords that represents the cluster. Context Augmenting attribute is a container for storing the cluster's context augmenting information. Children_messages attribute is a container for storing all its children message IDs.

With the above general description, a more detailed description of an illustrative method 300 as may be embodied and practiced (e.g., in data processing system 100 and system 200) will now be shown and described.

Figure 3A:
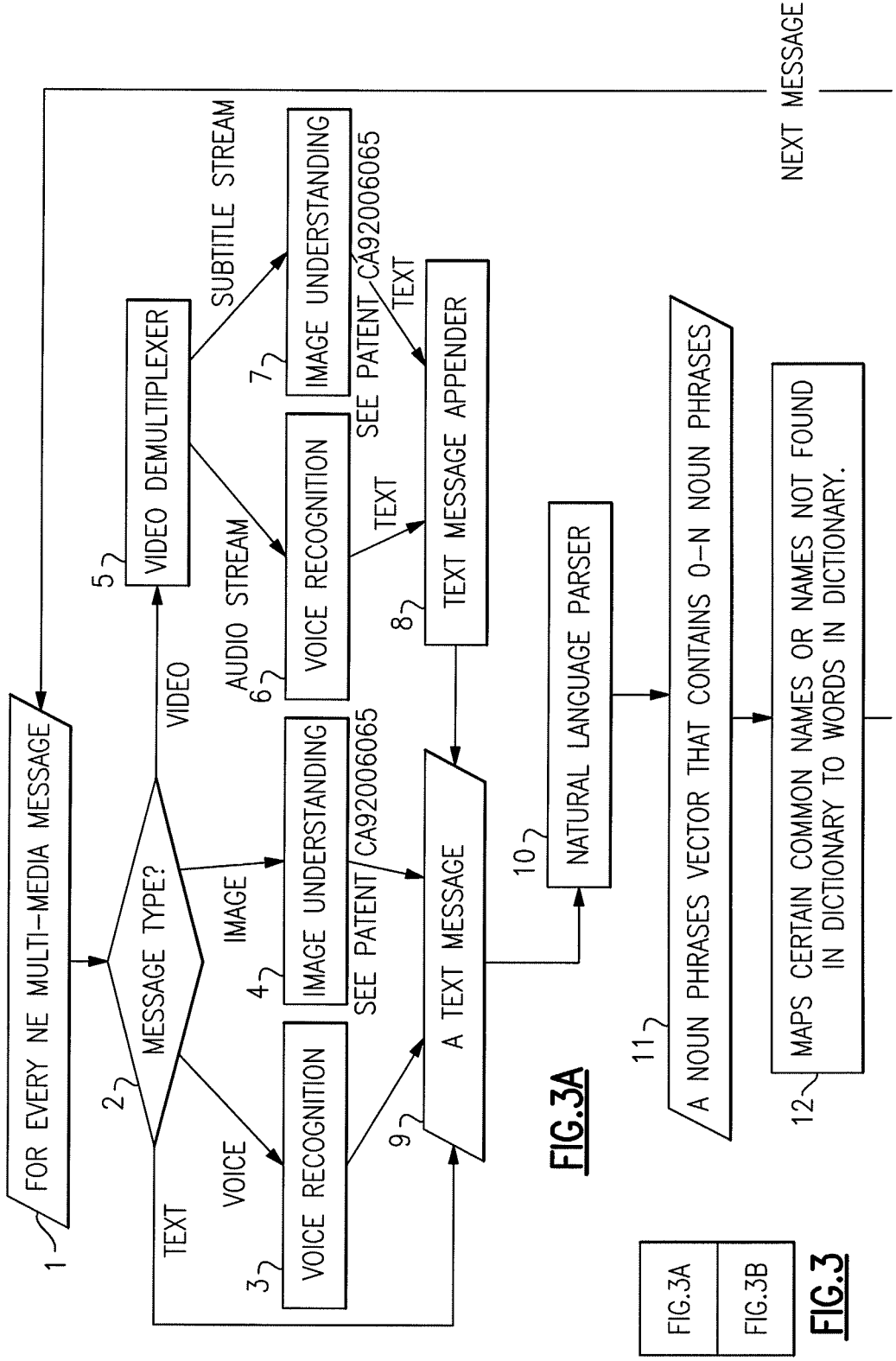
Figure 3B:
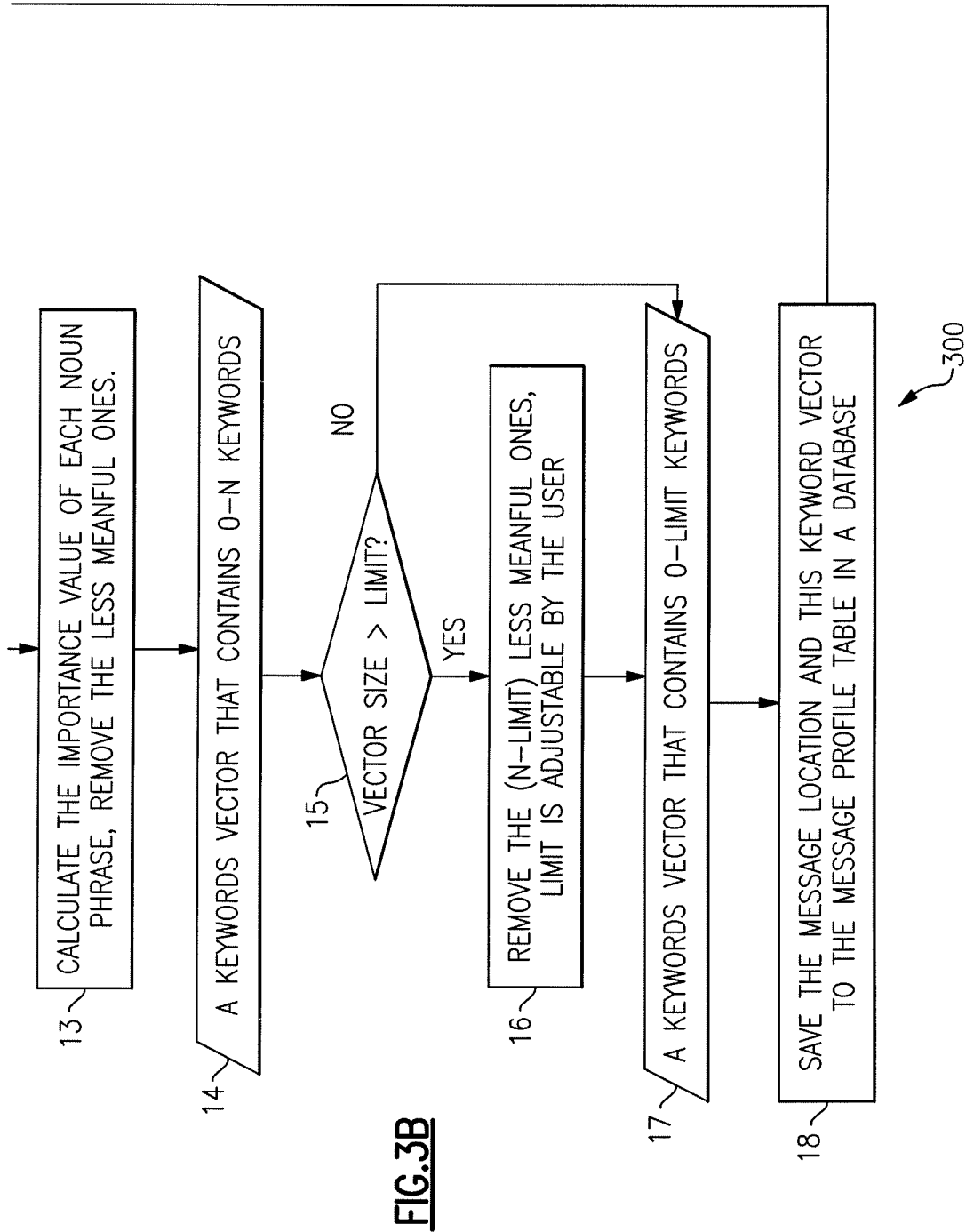

As shown in FIG. 3, method 300 may begin at block 3-1 where, for each new multi-modal message, method 300 loops from 3-2 to 3-18. At block 3-2, method 300 intercepts each multi-modal message using a message monitor module (e.g., real-time message monitor module 202), identifies the message type, and passes it down to its appropriate handlers.

Method 300 then proceeds to block 3-3, where if the message is in audio format, it may be translated into a text message (e.g., using voice recognition module 206). At block 3-4, method 300 may translate any image components to a text message by using an image understanding module (e.g., image understanding module 208) and image processing techniques as described, for example, in co-pending U.S. patent application Ser. No. 11/866,495 referenced above.

At block 3-5, if the communication mode is video, the video may be passed through a video demultiplexer in order to get both an audio and a video stream, and a subtitle stream if present. In an embodiment, the main content video stream may be ignored, and at block 3-6, method 300 may translate the audio stream into text using voice recognition techniques (e.g., using voice recognition module 206). At block 3-7, method 300 may process a subtitle stream into a text message using a subtitle extraction, if present. In addition to subtitles and/or closed captioned content may be processed and converted into plain text. At block 3-8, both text messages from the audio stream and the subtitle/closed captioned stream, if present, may be added together at the end of video processing.

Next, at block 3-9, after any necessary multi-modal translations, we get a consolidated text representation for the new message. Method 300 then proceeds to block 3-10, where the consolidated text representation may be parsed by using a natural language processing engine (e.g., natural language parsing engine 216, such as the GATE™ natural language engine). At block 3-10, this results in a variable sized vector of 0 to n number of noun phrases (including single word) being formed by method 300.

Method 300 may then proceed to block 3-12, where a table of common names to dictionary words may be used to map those non-dictionary defined noun phrases to related words that can be found in the dictionary (e.g., digital hierarchical dictionary 218—such as WORDNET™). Any industry dictionaries may also be used to construct this table to help comprehension in some specialized domains. Next, at block 3-13, method 300 may calculate the importance value of each noun phrase and remove the less important words. (For example, the importance value of each noun phrase may be decided by its depth in a semantic hierarchical tree of the WORDNET™ dictionary. For example, the term "bike" has a bigger importance value than "vehicle" because it has a more specific meaning.)

Next, at block 3-14, method 300 forms a vector of keywords. For some extremely large messages, the number of keywords they contain may be very large as well. In such a case, the less meaningful keywords can be removed to improve processing speed without much performance loss. The user can set the maximum number of keywords a message can have. At block 3-15, method 300 determines if the vector size is bigger than the maximum number allowed. If yes, method 300 proceeds to block 3-16, where method 300 removes the less meaningful keywords so the vector size is no bigger than the maximum number. If at block 3-15 the answer is no, method 300 proceeds directly to block 3-17. From block 3-16, method 300 proceeds to block 3-17, where method 300 now has a vector of keywords that has at most a maximum number of keywords. Optionally, an alignment algorithm may be applied here to sort this list of keywords so that keywords with similar meanings are clustered together in the list. This way, the keyword profile is made to be "more readable" by human readers.

Method 300 then proceeds to block 3-18, where the message location, start up command (the command script used to start up the program for processing the message, for example, QuickTime™ for video message, Outlook™ for email, Sametime™ for chat message) and the keyword vector may be stored in to the message profile object in a database (which may or may not be relational).

Figure 4:
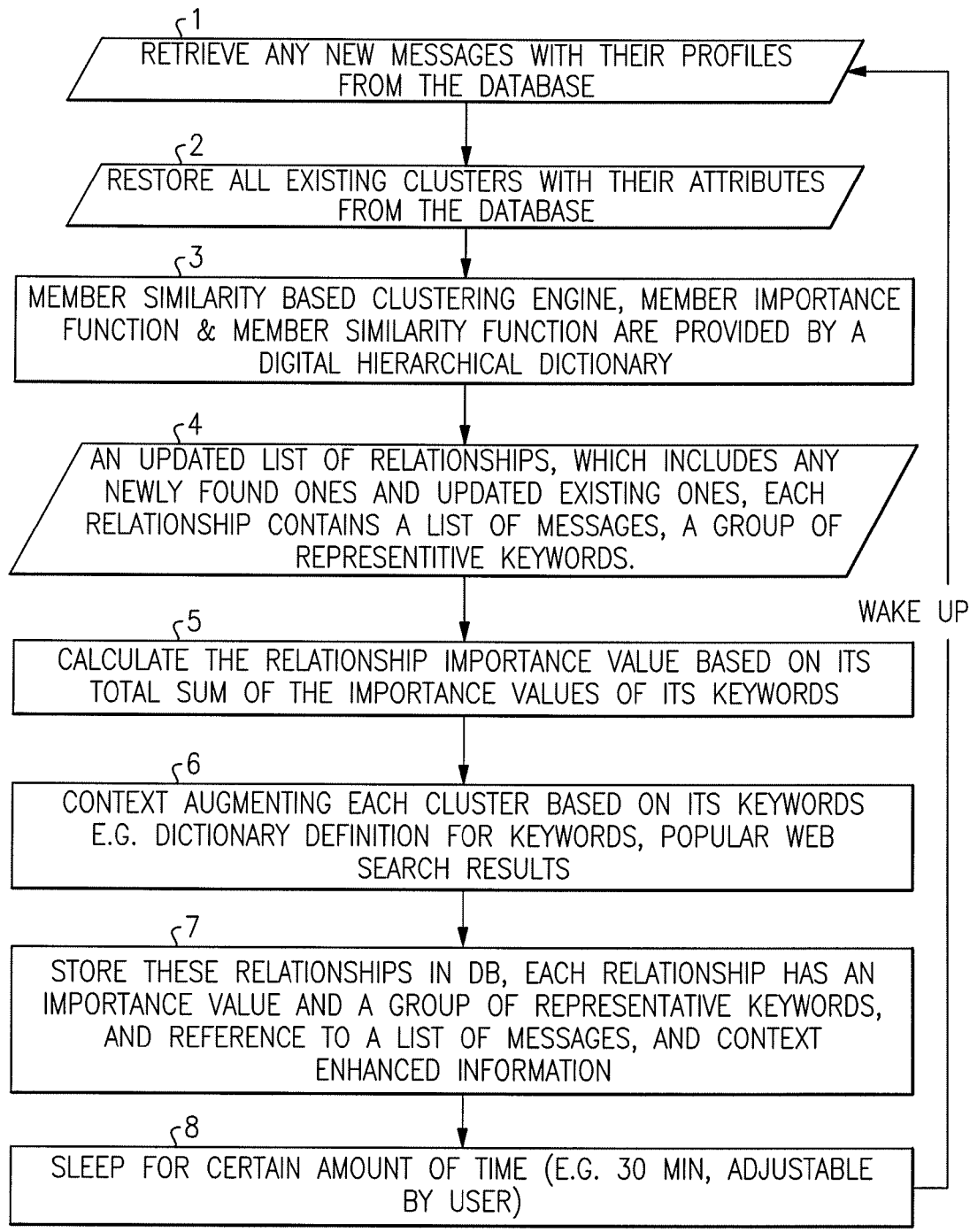

Now referring to FIG. 4, shown is an illustrative method 400 for generating a list of relationships, with each relationship including an importance value, representative keywords, and a list of messages. This process requires use of the clustering algorithm disclosed in co-pending U.S. patent application Ser. No. 11/828,416, as referenced above. This method 400 may also require context augmentation techniques as previously described.

As shown in FIG. 4, method 400 starts at block 4-1 by retrieving any new messages (those stored at step 3-18) and their respective profiles from the database. At block 4-2, method 400 restores all the existing clusters and their attributes from the database. Next, at block 4-3, method 400 inputs the new vectors of keywords to the member similarity based clustering engine. In an embodiment, a keyword is treated as a member by the natural language processing engine 208. For example, a member importance function may be implemented as the "depth" of a term in the semantic hierarchical tree of a dictionary 210, and the member similarity function may be implemented as the path distance in the semantic hierarchical tree of a dictionary.

Next, at block 4-4, method 400 may obtain a list of updated clusters, where each cluster contains a list of multi-modal messages, a list of all keywords contained in its list of messages, and a list of representative keywords. Method 400 may update the importance value of each cluster by calculating its total sum of importance values of all the keywords contained in its list of messages.

Method 400 then proceeds to block 4-6, where method 400 may augment the context of each cluster based on its keywords. Context augmentation for a keyword may include, for example, looking up the keyword on internal or an external "what is" type databases (e.g. for terms, acronyms); searching the web for a synopsis (e.g. for a reference to literature or speeches); looking for complimentary or competitive products/services/ideas to help gain additional context; and accessing other data sources that would help the user interpret the word or phrase (e.g., fads, trends, slang, etc.).

Next, method 400 may proceed to block 4-7, where context augmentation content may be stored in a system database together with the original consolidated content as a relationship cluster. Each relationship cluster may then have an importance value, a group of representative keywords, a reference to a list of messages and a list of context augmented information. Also, each new message's parent_clusters vector is updated with the newly identified cluster.

Method 400 may then proceed to block 4-8. In order to make efficient use of the computer resources it may not make sense to repeat through this process every time the system reaches 4-8. For example, in the health care example discussed earlier, it is unlikely that new pieces of communication would arrive every second. Instead in method 400 4-8 the process may sleep for certain amount of time (e.g., 30 minutes, a time period adjusted by the user), and wake up at step 4-1 again.

Now referring to FIG. 5, shown is a method 500 for displaying a message context relationship display. In an embodiment, method 500 may be activated at block 502 when a user accesses a message.

Next, at block 504, method 500 queries the parent_clusters vector of the current message profile object in the database to retrieve all the relationships that contain the current message, up to a predefined maximum size. Relationships can have different importance values based on the frequency of their appearance. More frequently occurring relationships have higher importance values. In order to save screen display space, only the most important relationships are displayed. In an embodiment, the maximum size may be adjustable by the user. Also, the most important relationship is retrieved first.

Method 500 then proceeds to block 506 where, for each relationship cluster, method 500 queries the children_messages vector of the current message cluster object in the database for all the messages it references, up to another maximum size which can also be adjusted by the user. Also, the most important message is retrieved first.

Next, method 500 proceeds to block 508, where the list of relationship clusters is displayed. Each cluster may have a sub-list of its member messages. Each member message is a hyperlink, when it's clicked; its related application starts up and plays an audio/video clip, displays an image, shows an email or a chat message, etc. Context augmented information may be displayed in a similar way.

As will be appreciated, the multi-modal communications from a workgroup, as described earlier, may be converted into a common text format and consolidated into a single information source instead of a number of incompatible pieces of information. A user may then be able to exploit this consolidated information to enhance understanding of the various pieces of information received from her/his peers in the workgroup. It will also be appreciated that the peers are not restricted as to what type of communication mode they use, as their communication may now be consolidated and analyzed together.

While various illustrative embodiments of the invention have been described above, it will be appreciated by those skilled in the art that variations and modifications may be made. Thus, the scope of the invention is defined by the following claims.

What is claimed is:

1. A method of processing multi-modal communications, comprising the steps of:
   intercepting each incoming message of a plurality of messages, wherein said plurality of messages are characterized by at least two different modes, one of said modes being a non-text mode;
   converting each intercepted message into a single text format shared by each message;
   parsing each message in the shared text format into a list of keywords;
   analyzing the list of keyword for each message to generate a respective vector of at least one keyword for each message, wherein said vector is based on a path distance in a semantic hierarchical tree of a dictionary;
   calculating a similarity distance between the messages based on their respective vectors of keywords; and
   clustering the messages into a plurality of message clusters based upon the calculated similarity distances.

2. The method of claim 1, further comprising the steps of:
   searching for common references in the messages of a given message cluster;
   obtaining contextual content related in subject matter to the common references; and
   linking the related contextual content of the common references to the common references.

3. The method of claim 2, wherein the linking step comprises hyperlinking the related contextual content.

4. The method of claim 2, further comprising the step of displaying the plurality of message clusters as a list of context threads.

5. A computer-based system for processing multi-modal communications, comprising:
   a central processing unit;
   a real time message monitor component for intercepting each incoming message of a plurality of messages, wherein said plurality of messages are characterized by at least two different modes, one of said modes being a non-text mode;
   a conversion module for converting each intercepted message into a single shared text format shared by each message;
   a natural language parsing engine comprising a processor and configured to parse each message in the shared text format into a list of keywords;
   a digital hierarchical dictionary for calculating a similarity distance between the list of keywords for each message; and
   a member similarity based clustering algorithm module for clustering the messages into context threads based upon the calculated similarity distances.

6. The system of claim 5, further comprising a context augmenting module configured to search the messages for common references, and to augment the context of the common references by linking related content.

7. The system of claim 6, wherein the context augmenting module is further configured to hyperlink the related content.

8. The system of claim 5, further comprising a GUI component configured to show the clustered messages as a list of context threads.

9. A non-transitory data processor readable medium storing data processor code that, when loaded into a data processing device, adapts the device to perform a method of processing multi-modal communications, the data processor readable medium comprising:
- code for intercepting a plurality of incoming text based messages;
- code for converting each incoming text based message into a single text format shared by each of said plurality of incoming text based messages;
- code for intercepting a plurality of incoming audio based messages;
- code for converting each incoming audio based message into said single text format;
- code for parsing each of the converted plurality of incoming text based messages and each of the converted incoming audio based messages into a list of keywords;
- code for analyzing the list of keywords for each message to generate a respective vector of at least one keyword for each message, wherein said vector is based on a path distance in a semantic hierarchical tree of a dictionary;
- code for calculating a similarity distance between the messages based on their respective vectors of keywords; and
- code for clustering into topical message clusters based upon the calculated similarity distances.

10. The data processor readable medium of claim 9, further comprising:
- code for searching for common references in the messages of a topical message cluster;
- code for obtaining contextual content related in subject matter to the common references; and
- code for linking the related contextual content to the common references.

11. The data processor readable medium of claim 10, further comprising code for hyperlinking the related content.

12. The data processor readable medium of claim 9, further comprising code for displaying the clustered messages as a list of context threads.

13. The medium of claim 9 further comprising:
- code for intercepting a plurality of incoming audiovisual based messages; and
- code for converting an audio portion of each incoming audiovisual based message into said single text format.

14. The medium of claim 9 further comprising:
- code for intercepting a plurality of incoming image based messages; and
- code for converting each image based message into said single text format.

* * * * *